United States Patent [19]

Sano et al.

[11] 4,309,902

[45] Jan. 12, 1982

[54] METHOD FOR CONTINUOUSLY MEASURING STEEPNESS OF DEFECTIVE FLATNESS OF METAL STRIP DURING ROLLING

[75] Inventors: Kazuo Sano; Katsujiro Watanabe, both of Tokyo; Seigo Ando, Yokohama, all of Japan

[73] Assignee: Nippon Kokan Kabushiki Kaisha, Tokyo, Japan

[21] Appl. No.: 107,420

[22] Filed: Dec. 26, 1979

[30] Foreign Application Priority Data

Jan. 29, 1979 [JP] Japan .................................. 54-8151

[51] Int. Cl.³ .......................... G01B 7/14; G01L 5/04; G01R 33/12
[52] U.S. Cl. ....................................... 73/159; 324/207
[58] Field of Search .................... 73/105, 159, 579; 364/563; 324/207, 206

[56] References Cited

U.S. PATENT DOCUMENTS

| | | | |
|---|---|---|---|
| 3,403,548 | 10/1968 | Petrik et al. | 73/579 X |
| 3,499,306 | 3/1970 | Pearson | 73/159 X |
| 3,502,968 | 3/1970 | Tobin, Jr. et al. | 324/243 |
| 3,548,640 | 12/1970 | Deason et al. | 73/579 X |
| 3,720,818 | 3/1973 | Spragg et al. | 364/487 X |
| 4,031,752 | 6/1977 | Sanders | 73/159 |
| 4,103,542 | 8/1978 | Wheeler et al. | 73/105 |

FOREIGN PATENT DOCUMENTS

| | | | |
|---|---|---|---|
| 50-80860 | 7/1975 | Japan | 73/579 X |
| 51-51963 | 5/1976 | Japan | 73/579 X |
| 51-53843 | 5/1976 | Japan | 73/579 X |

*Primary Examiner*—Daniel M. Yasich

*Attorney, Agent, or Firm*—Frishauf, Holtz, Goodman & Woodward

[57] ABSTRACT

A method for continuously measuring the steepness of a defective flatness of a metal strip during rolling, which comprises: detecting a variation in the relative distance between a metal strip during rolling and a distance-detecting means arranged adjacent to the surface of said metal strip, during the travel thereof between two support rolls arranged at a prescribed spacing, by means of said distance-detecting means, as a vibration including a vibration corresponding to a defective flatness produced in said metal strip; calculating the natural vibration frequency of said metal strip during the travel thereof between said two support rolls, from the detected value of the tension applied to said metal strip during the travel thereof between said two support rolls, the specific weight of said metal strip, and the distance between said two support rolls; cutting off the frequency components, which are below said calculated value of the frequency of said metal strip, from said detected value of the vibration of said metal strip obtained by said distance-detecting means, to detect the vibration of said metal strip, which corresponds to only the defective flatness of said metal strip; detecting, from said detected value thus obtained of the vibration of said metal strip, which corresponds to only said defective flatness, the amplitude and the frequency of said vibration; and, continuously calculating the ratio amplitude/(travelling speed/frequency) of said vibration, i.e., the accurate steepness of the defective flatness of said metal strip, from the detected values thus obtained of the amplitude and the frequency of said vibration, and the separately determined travelling speed of said metal strip.

1 Claim, 4 Drawing Figures

METHOD FOR CONTINUOUSLY MEASURING STEEPNESS OF DEFECTIVE FLATNESS OF METAL STRIP DURING ROLLING

REFERENCE TO PATENTS, APPLICATIONS AND PUBLICATIONS PERTINENT TO THE INVENTION (1) Japanese Patent Provisional Publication No. 80,860/75 dated July 1, 1975;
(2) Japanese Patent Provisional Publication No. 51,963/76 dated May 7, 1976; and,
(3) Japanese Patent Provisional Publication No. 53,843/76 dated May 12, 1976.

The contents of the above prior art documents will be discussed under the heading of the "BACKGROUND OF THE INVENTION" presented herebelow.

FIELD OF THE INVENTION

The present invention relates to a method for measuring the steepness of a defective flatness of a metal strip during rolling by detecting the amplitude and the frequency of a variation in the relative distance caused by a defective flatness of said metal strip, between said metal strip and a distance-detecting means arranged adjacent to the surface of said metal strip, and detecting the travelling speed of said metal strip.

BACKGROUND OF THE INVENTION

A metal strip such as a steel strip, generally manufactured by rolling a raw material using mill rolls, may have a defective flatness caused by a non-uniformity in thickness in the width direction of the strip. More particularly, types of defective flatness include center buckling, quarter buckling and wavy edge. Such a defective flatness of a metal strip is produced during such processes as continuous hot rolling, skin-pass rolling and continuous cold rolling. Accurate and quick measurement of a defective flatness of a metal strip, if possible, would give the following effects:

(i) it would be possible to determined the timing for changing mill rolls;
(ii) data could be made available for continuously controlling the flatness of the metal strip during rolling; and,
(iii) the results could be used for quality control of the product such as classification by the degree of defective flatness.

One of the known factors quantitatively representing the degree of defective flatness of a metal strip as mentioned above is the steepness. When the wave length at the portion of the metal strip having the above-mentioned defective flatness is $l_1$, and the amplitude is $h_1$, then the steepness is expressed as $h_1/l_1$.

Since, when a defective flatness occurs in a metal strip during rolling, a variation is produced in the relative distance (hereinafter referred to as a "vibration"), having an amplitude and a frequency corresponding to said defective flatness, between said metal strip and a distance-detecting means arranged adjacent to the surface of said metal strip, a method for continuously measuring the steepness of a defective flatness of a metal strip during rolling has been proposed, which comprises:

(a) detecting a variation in the relative distance between a metal strip during rolling and a distance-detecting coil arranged adjacent to the surface of said metal strip, i.e., a vibration, during the travel thereof between two support rolls arranged at a prescribed spacing, by means of said distance-detecting coil, as a vibration corresponding to a defective flatness produced in said metal strip;

(b) detecting the amplitude and the frequency of said vibration produced in said metal strip from said detected vibration; and, (c) continuously calculating the ratio amplitude/(travelling speed/frequency) of said vibration, i.e., the steepness of the defective flatness of said metal strip from the detected values thus obtained of amplitude and frequency of said vibration and the value separately detected of the travelling speed of said metal strip.

As a distance-detecting apparatus to be used in the above-mentioned step (a), i.e., the step of detecting a vibration produced in a metal strip during rolling, for example, the following three distance-detecting apparatuses are disclosed in Japanese Patent Provisional Publication No. 53,843/76 dated May 12, 1976:

(I) A distance-detecting apparatus which comprises: a distance-detecting coil arranged adjacent to the surface of a metal strip during rolling; an AC bridge comprising four impedance elements and an oscillator as an electromotive force; and a differential amplifier connected to the output terminal of said AC bridge. Said distance-detecting coil comprises one of the four impedance elements of said AC bridge. This detecting apparatus is hereinafter referred to as the "distance-detecting apparatus (I)".

The above-described distance-detecting apparatus (I) operates as follows. In a balanced state of the AC bridge, when the metal strip during rolling vibrates under the effect of a defective flatness thereof, there occurs a change in the impedance of the distance-detecting coil. As a result, an output appears at the output terminal of the AC bridge, which corresponds to a vibration in the relative distance between the metal strip and the distance-detecting coil. This output appears at the output terminal of the differential amplifier as the output signal of said vibration in relative distance.

(II) A second known distance-detecting apparatus comprises: a parallel resonance element comprising a distance-detecting coil arranged adjacent to the surface of a metal strip during rolling and a capacitor; an oscillator connected in parallel with said parallel resonance element; and a positive feedback amplifier connected at the input terminal thereof with said parallel resonance element and said oscillator (hereinafter referred to as the "distance-detecting apparatus (II)".

The distance-detecting apparatus (II) operates as follows. In a state where the resonance frequency of the resonance circuit of the parallel resonance element becomes equal to the oscillation frequency of the oscillator through adjustment of the capacity of the capacitor, when the metal strip during rolling vibrates under the effect of a defective flatness, there occurs a change in the impedance of the distance-detecting coil. As a result, the resonance frequency of the resonance circuit shows a change corresponding to the variation in the relative distance between the metal strip and the distance-detecting coil, thus causing an output signal of said variation in relative distance to appear at the output terminal of the positive feedback amplifier. The distance-detecting apparatus (II) is characterized in that it is possible to control the quality factor of the resonance circuit by adjusting the degree of amplification and/or the amount of positive feedback of the positive feedback amplifier, thus enabling to linearize the output characteristics of the output signal of said variation in relative distance. The above-mentioned distance-detecting apparatus (II) is disclosed also in Japanese Patent Provisional Publication No. 80,860/75 dated July 1, 1975 and Japanese Patent Provisional Publication No. 51,963/76 dated May 7, 1976.

(III) Another known distance-detecting apparatus comprises: a differential amplifier; a distance-detecting coil arranged adjacent to the surface of a metal strip during rolling and connected to the positive input terminal of said differential amplifier; a positive feedback impedance element connected to the positive input terminal of said differential amplifier; and an oscillator connected to the negative input terminal of said differential amplifier (hereinafter referred to as the "distance-detecting apparatus (III)".

The distance-detecting apparatus (III) operates as follows. When the metal strip during rolling vibrates under the effect of a defective flatness, there occurs a change in the impedance of the distance-detecting coil through which an AC current of the oscillation frequency of the oscillator flows. As a result, the differential amplifier shows a change in the degree of amplification corresponding to the vibration in the relative distance between the metal strip and the distance-detecting coil, thus causing an output signal of said variation in relative distance to appear at the output terminal of the differential amplifier. The distance-detecting apparatus (III) is characterized in that, while the changing characteristics of the impedance of the distance-detecting coil corresponding to said variation in relative distance are non-linear, the changing characteristics of the impedance of the distance-detecting coil are compensated by adjusting the degree of amplification and/or amount of positive feedback of the differential amplifier, thus resulting in linearization of the changing characteristics of the output signal from the differential amplifier corresponding to said variation in relative distance.

A method for measuring the steepness of a defective flatness of a metal strip during rolling is disclosed in the above-mentioned Japanese Patent Provisional Publication No. 80,860/75, which comprises arranging a scanning mechanism at a prescribed position below a metal strip during rolling and adjacent to the surface of said metal strip, and holding a distance-detecting coil movably on said scanning mechanism, thereby detecting a vibration of said metal strip at any position on said metal strip.

As a means to be used in the above-mentioned step (b), i.e., the step of detecting the amplitude and the frequency of a vibration produced in the metal strip, the conventionally known means include a detector circuit for detecting an output signal from the distance-detecting apparatus to obtain a voltage corresponding to the amplitude of said output signal as a voltage corresponding to the amplitude of the vibration produced in said metal strip, and a frequency/voltage converter (hereinafter referred to as an "F/V converter") for obtaining a voltage corresponding to the frequency of an output signal from the distance-detecting apparatus as a voltage corresponding to the frequency of the vibration produced in said metal strip.

As a means to be used in the above-mentioned step (c), i.e., the step of calculating the steepness of a defective flatness of a metal strip from the detected values of amplitude and frequency of a vibration produced in said metal strip, a calculating circuit is conventionally known for entering an output signal from a detector circuit, an output signal from an F/V converter, and an output signal of the travelling speed of the metal strip (for example, an output signal having a voltage corresponding to the travelling speed of the metal strip is obtained through a tachometer connected to the rotation shaft of a support roll or a deflector roll for the metal strip during rolling), and calculating the steepness of a defective flatness of the metal strip by the following formula from the voltage values of these output signals:

$$\sigma = \frac{h_2}{V/f}.$$

where,
$\sigma$: steepness,
$h_2$: detected value of amplitude of the vibration produced in a metal strip during rolling,
$V$: detected value of travelling speed of said metal strip,
$f$: detected value of frequency of the vibration produced in said metal strip.

However, the conventional method for continuously measuring the steepness of a defective flatness of a metal strip during rolling, which comprises the above-mentioned steps (a), (b) and (c), has the following problems. More specifically, FIG. 1 is a descriptive drawing illustrating an example of vibration of a metal strip during the travel thereof between two support rolls arranged at a prescribed distance. In FIGS. 1, 4 and 5 are support rolls, and 1 is a metal strip travelling between the two support rolls 4 and 5. A vibration having an amplitude $h_3$ and a wave length $l_2$ corresponding to a defective flatness, as shown by a solid line, is produced in the metal strip 1. In addition, irrespective of the presence of a defective flatness, a natural vibration "a", as shown by a chain line, is necessarily produced in the metal strip 1 during rolling. Thus, the vibration corresponding to the defective flatness and the natural vibration are detected in the form of a composite vibration by the distance-detecting apparatus. Therefore, since the value detected by the detector circuit and the value detected by the F/V converter are affected by the natural vibration, it is impossible to accurately calculate the steepness of the defective flatness of the metal strip 1 during rolling through the calculating circuit.

SUMMARY OF THE INVENTION

A principal object of the present invention is therefore to provide a method for continuously measuring the accurate steepness of a defective flatness of a metal strip during rolling.

In accordance with one of the features of the present invention, there is provided a method for continuously measuring the steepness of a defective flatness of a metal strip during rolling, which comprises:

detecting a variation in the relative distance between a metal strip rolling and a distance-detecting means arranged adjacent to the surface of said metal strip, during the travel thereof between two support rolls arranged at a prescribed spacing, by means of said distance-detecting means, as a vibration corresponding to a defective flatness produced in said metal strip;

detecting the amplitude and the frequency of the vibration produced in said metal strip from the detected value thus obtained of the vibration of said metal strip; and, continuously calculating the ratio amplitude/(travelling speed/frequency) of said vibration, i.e., the steepness of the defective flatness of said metal strip, from the detected values thus obtained of the amplitude and the frequency of said vibration, and the detected value of the travelling speed of said metal strip determined separately;

said method being characterized by:

detecting the tension applied to said metal strip during the travel thereof between said two support rolls;

calculating the frequency of the natural vibration of said metal strip during the travel thereof between said two support rolls, from the detected value thus obtained of the tension applied to said metal strip, the specific weight of said metal strip, and the distance between said two support rolls; and, prior to said detection of the amplitude and the frequency of said vibration produced in said metal strip, cutting off the frequency component, which is below said calculated value of the frequency of the natural vibration of said metal strip, from said detected value of the vibration of said metal strip obtained by said distance-detecting means, thereby measuring the accurate steepness of the defective flatness of said metal strip.

DETAILED DESCRIPTION OF PREFERRED EMBODIMENTS

Figure 1:
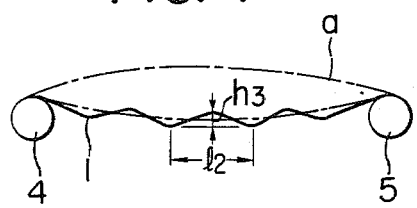
FIG. 1 is a descriptive drawing illustrating an example of vibration of a metal strip during the travel thereof between two support rolls arranged at a prescribed spacing.

With a view to solving the aforementioned problems involved in the conventional methods for continuously measuring the steepness of a defective flatness of a metal strip during rolling, we carried out extensive studies, and obtained as a result the following findings:

(i) The frequency of the natural vibration of a metal strip during the travel thereof between two support rolls arranged at a prescribed distance is far lower than the frequency of a vibration corresponding to a defective flatness of said metal strip (i.e., a variation in the relative distance between said metal strip and distance-detecting means arranged adjacent to the surface of said metal strip). These two types of vibration frequencies can therefore be discriminated clearly.

(ii) Since the frequency of the natural vibration of a metal strip during rolling depends upon the tension applied to said metal strip during the travel thereof between the above-mentioned two support rolls, the specific weight of said metal strip, and the distance between said two support rolls, it is easy to calculate the frequency of the natural vibration of the metal strip during rolling.

(iii) It is therefore possible to solve the above-mentioned problems in the conventional methods by calculating, in the conventional methods for continuously measuring the steepness of a defective flatness of a metal strip during rolling, the frequency of the natural vibration of said metal strip, and prior to detecting the amplitude and the frequency of a vibration of said metal strip, cutting off the frequency component, which is under the calculated value of the frequency of the natural vibration of said metal strip, from the detected value of the frequency of the above-mentioned variation in relative distance (i.e., a vibration) produced in said metal strip.

The present invention was made on the basis of the above-mentioned findings (i) to (iii), and the method for continuously measuring the steepness of a defective flatness of a metal strip during rolling of the present invention comprises:

detecting a variation in the relative distance between a metal strip during rolling and a distance-detecting means arranged adjacent to the surface of said metal strip, during the travel thereof between two support rolls arranged at a prescribed distance, by means of said distance-detecting means, as a vibration corresponding to a defective flatness produced in said metal strip;

detecting the amplitude and the frequency of the vibration produced in said metal strip from the detected value thus obtained of the vibration of said metal strip; and, continuously calculating the ratio amplitude/(travelling speed/frequency) of said vibration, i.e., the steepness of the defective flatness of said metal strip, from the detected values thus obtained of the amplitude and the frequency of said vibration, and the detected value of the travelling speed of said metal strip determined separately;

said method being characterized by:

detecting the tension applied to said metal strip during the travel thereof between said two support rolls;

calculating the frequency of the natural vibration of said metal strip during the travel thereof between said two support rolls, from the detected value thus obtained of the tension applied to said metal strip, the specific weight of said metal strip, and the distance between said two support rolls; and, prior to said detection of the amplitude and the frequency of said vibration produced in said metal strip, cutting off the frequency component, which is under said calculated value of the frequency of the natural vibration of said metal strip, from said detected value of the vibration of said metal strip obtained by said distance-detecting means, thereby measuring the accurate steepness of the defective flatness of said metal strip.

Now, the method for continuously measuring the steepness of a defective flatness of a metal strip during rolling of the present invention is described more in detail by means of an example with reference to the drawings.

EXAMPLE

Figure 2:
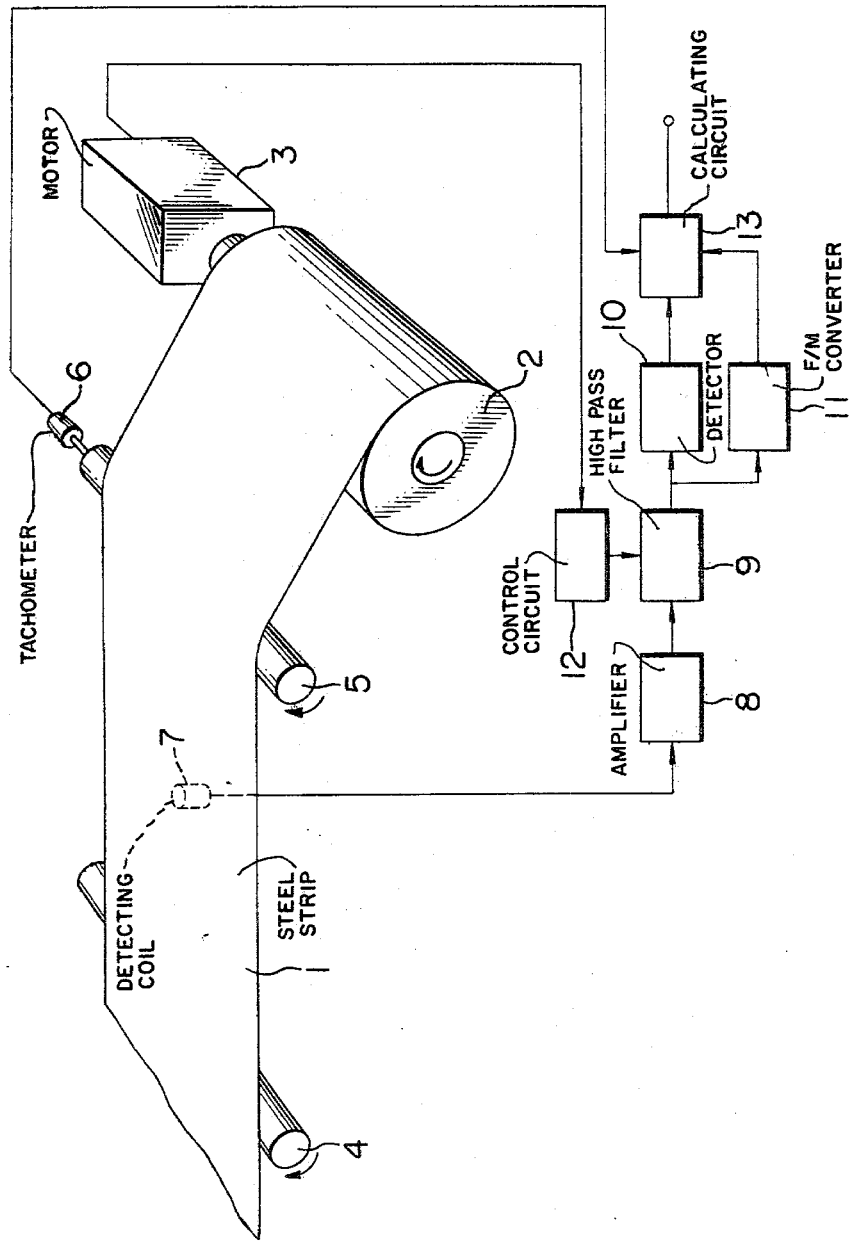
FIG. 2 is a schematic descriptive drawing illustrating an embodiment of the method of the present invention, partly with a perspective view and partly with a block diagram.
Figure 2:
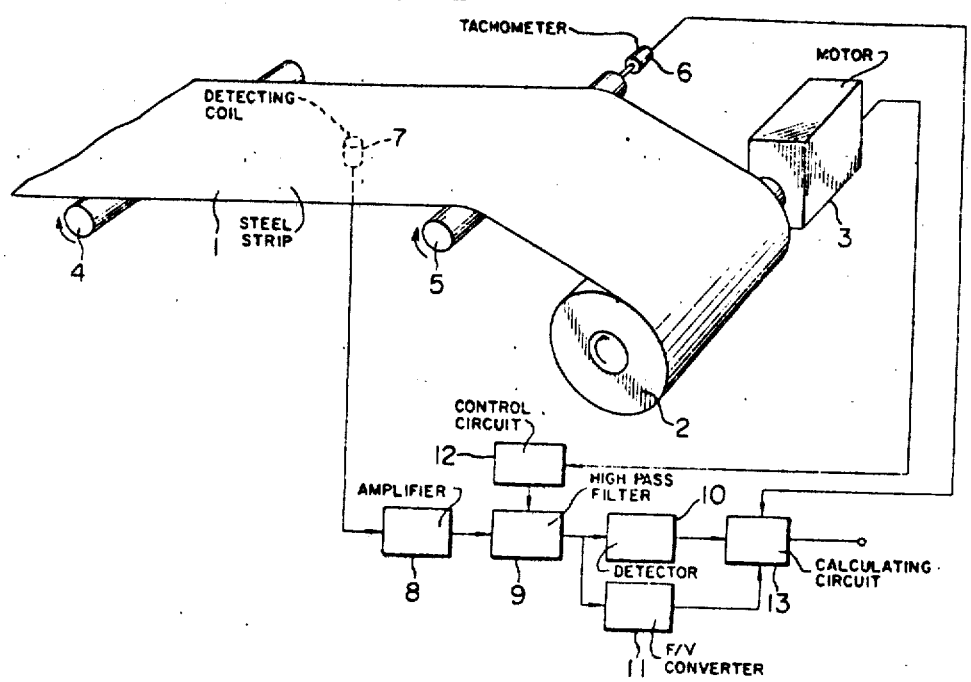

FIG. 2 is a schematic descriptive drawing illustrating an embodiment of the method of the present invention, partly with a perspective view and partly with a block diagram. FIG. 2 covers a portion at and around a hot-rolled steel strip being coiled onto a mandrel in a continuous hot strip rolling mill.

In FIG. 2, 1 is a hot-rolled steel strip during rolling; 2 is a coil of the hot-rolled steel strip 1 coiled onto a rotatable mandrel; 3 is a motor for rotatably driving the mandrel; 4 and 5 are support rolls, arranged at a prescribed distance apart, for supporting the hot-rolled steel strip 1; 6 is a tachometer, connected to the support roll 5, for giving an output signal having a voltage proportional to the travelling speed of the hot-rolled steel strip 1; and, 7 is a distance-detecting coil arranged between the two support rolls 4 and 5 and adjacent to the surface of the hot-rolled steel strip 1. The distance-detecting coil 7 is held movably in the width direction of the hot-rolled steel strip 1 on a conventional scanning mechanism (not shown) arranged at a prescribed position below the hot-rolled steel strip 1, and adjacent to the surface of the hot-rolled steel strip 1, at right angles to the rolling direction of the hot-rolled steel strip 1. Therefore, the distance-detecting coil 7 can detect a variation in the relative distance (i.e., a vibration) between the hot-rolled steel strip 1 during rolling and the distance-detecting coil 7, at any point in the width direction of the hot-rolled steel strip 1. The distance-detecting coil 7 is connected to a positive feedback amplifier 8. The above-mentioned distance-detecting apparatus comprises the distance-detecting coil 7, the positive feedback amplifier 8, and an oscillator (not shown). Thus, an output signal corresponding to a variation in the relative distance between the hot-rolled steel strip 1 and the distance-detecting coil 7, which corresponds to a vibration produced in the hot-rolled steel strip 1 during rolling, is obtained from the positive feedback amplifier 8.

In FIG. 2, 9 is a high-pass filter having a changeable cut-off frequency; 10 is a detector circuit; 11 is an F/V (frequency-to-voltage) converter; 12 is a control circuit for controlling the cut-off frequency of the high-pass filter 9; and, 13 is a calculating circuit. The output signal from the positive feedback amplifier 8 is entered through the high-pass filter 9 into the detector circuit 10 and the F/V converter 11. A detected value of the tension, having a voltage corresponding to the tension applied to the hot-rolled steel strip 1 during the travel thereof between the two support rolls 4 and 5, from a circuit (not shown) for detecting the current flowing through the armature of the motor 3 for driving the mandrel is entered into the control circuit 12. Based on said detected value of the tension, the value previously obtained of the distance between the two support rolls 4 and 5, and the specific weight of the hot-rolled steel strip 1, the frequency of the natural vibration of the hot-rolled steel strip 1 during the travel thereof between the two support rolls 4 and 5 is calculated by the control circuit 12 in accordance with the following formula, and the value thus calculated is entered into the high-pass filter 9:

$$f_L = \frac{1}{2L} \sqrt{\frac{g \times 10^5}{\gamma} \cdot \bar{\sigma}}$$

where,
$f_L$: frequency of the natural vibration of the hot-rolled steel strip 1 during the travel thereof between the two support rolls 4 and 5,
L: distance between the two support rolls 4 and 5 (cm),
$\gamma$: specific weight of the hot-rolled steel strip 1 (g/cm$^3$),
g: gravitational acceleration (cm/sec$^2$), and
$\bar{\sigma}$: average tension applied to the hot-rolled steel strip 1 during the travel thereof between the two support rolls 4 and 5 (kg/mm$^2$).

As a result, the cut-off frequency of the high-pass filter 9 is controlled on the basis of the value thus calculated by the above-mentioned formula. Therefore, the output signal from the positive feedback amplifier 8 is entered into the detector circuit 10 and the F/V converter 11, after the frequency components below the calculated value of the frequency of the natural vibration of the hot-rolled steel strip 1 are cut off by the high-pass filter 9. Thus, only the voltage signal corresponding to the frequency of the vibration caused by a defective flatness of the hot-rolled steel strip 1 is entered into the detector circuit 10 and the F/V converter 11.

The detector circuit 10 detects the signal having passed through the high-pass filter 9, and puts out a signal having a voltage corresponding to the amplitude of this signal. The F/V converter 11 puts out a signal having a voltage corresponding to the frequency of the signal having passed through the high-pass filter 9. Output signals from the detector circuit 10, the F/V converter 11 and the tachometer 6 are entered into the calculating circuit 13, in which the steepness of the defective flatness of the hot-rolled steel strip 1 is calculated based on these signals. The result of calculation is put out from the calculating circuit 13 as a signal corresponding to the measured steepness.

Figure 3A:
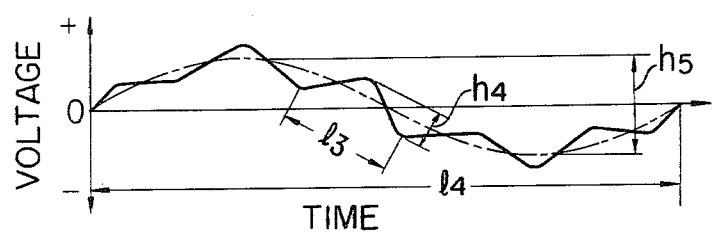
FIG. 3 (A) illustrates an example of a voltage wave form of an output signal from the positive feedback amplifier in the present invention; and, FIG. 3 (B) illustrates an example of a voltage wave form of an output signal from the high-pass filter in the present invention.
Figure 3B:
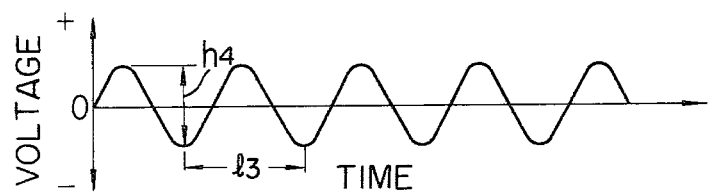

FIG. 3 (A) illustrates an example of a voltage wave form of an output signal from the positive feedback amplifier 8, and FIG. 3 (B) an example of a voltage wave form of an output signal from the high-pass filter 9. In FIG. 3 (A), the solid line shows the voltage waveform corresponding to a vibration produced in the hot-rolled steel strip 1 during the travel thereof between the two support rolls 4 and 5. This voltage wave form has a composite wave form comprised of a frequency component of the vibration corresponding to the defective flatness of the hot-rolled steel strip 1, which has a wave length $l_3$ and an amplitude $h_4$, and another frequency component of the natural vibration of the hot-rolled steel strip 1, which has a wave length $l_4$ and an amplitude $h_5$, as shown by the chain line. The output signal from the positive feedback amplifier 8, which has the voltage wave form as shown in FIG. 3 (A), is converted into a signal having a voltage wave form with a wave length $l_3$ and an amplitude $h_4$, which corresponds to only the defective flatness of the hot-rolled steel strip 1, as shown in FIG. 3 (B), after the frequency component of the natural vibration of the hot-rolled steel strip 1 is cut off by passing through the high-pass filter 9. It is therefore possible to measure the steepness of the defective flatness of the hot-rolled steel strip 1 very accurately without being affected by the natural vibration of the hot-rolled steel strip 1.

In the Example described above, the circuit for detecting the current flowing through the armature of the motor 3 for driving the mandrel has been employed for detecting the tension applied to the hot-rolled steel strip 1 during the travel thereof between the two support rolls 4 and 5. However, it is also possible to detect the tension applied to the hot-rolled steel strip 1 during the travel thereof between the two support rolls 4 and 5, by a conventional tension-detecting means comprising a plurality of rollers in direct contact with the hot-rolled steel strip 1.

According to the method of the present invention, as described above in detail, it is possible to measure the steepness of a defective flatness of a metal strip during rolling very accurately, and therefore, many industrially useful effects are provided as follows:

(a) the results can be used as accurate data for continuously controlling the flatness of a metal strip during rolling;

(b) the timing for changing mill rolls can be properly determined; and, (c) the method is applicable for quality control purposes such as classification by the degree of defective flatness of products.

What is claimed is:

1. A method for continuously measuring the steepness of a defective flatness of a metal strip during rolling, which comprises:

detecting a variation in the relative distance between a metal strip during rolling and a distance-detecting means arranged adjacent to the surface of said metal strip, during the travel thereof between two support rolls arranged at a prescribed spacing, by means of said distance-detecting means, as a vibration corresponding to a defective flatness produced in said metal strip;

detecting the amplitude and the frequency of the vibration produced in said metal strip from the detected value thus obtained of the vibration of said metal strip; and, continuously calculating the ratio amplitude/(travelling speed/frequency) of said vibration, i.e., the steepness of the defective flatness of said metal strip, from the detected values thus obtained of the amplitude and the frequency of said vibration, and the detected value of the travelling speed of said metal strip determined separately;

said method being characterized by:

detecting the tension applied to said metal strip during the travel thereof between said two support rolls;

calculating, in accordance with the following formula, the frequency of the natural vibration of said metal strip during the travel thereof between said two support rolls, from the detected value thus obtained of the tension applied to said metal strip, the specific weight of said metal strip, and the distance between said two support rolls:

$$f_L = \frac{1}{2L} \sqrt{\frac{g \times 10^5}{\gamma} \cdot \overline{\sigma}}$$

where, $f_L$: frequency of said natural vibration of said hot-rolled steel strip during the travel thereof between said two support rolls, L: distance between said two support rolls (cm), $\gamma$: specific weight of said hot-rolled steel strip (g/cm$^3$), g: gravitational acceleration (cm/sec$^2$), and $\overline{\sigma}$: average tension applied to said hot-rolled steel strip during the travel thereof between said two support rolls (kg/mm$^2$); and prior to said detection of the amplitude and the frequency of said vibration produced in said metal strip, cutting off the frequency component, which is below said calculated value of the frequency of the natural vibration of said metal strip, from said detected value of the vibration of said metal strip obtained by said distance-detecting means, thereby measuring the accurate steepness of the defective flatness of said metal strip.

* * * * *

UNITED STATES PATENT AND TRADEMARK OFFICE
CERTIFICATE OF CORRECTION

PATENT NO. : 4,309,902                                   Page 1 of 2

DATED : January 12, 1982

INVENTOR(S) : Kazuo Sano et al.

It is certified that error appears in the above—identified patent and that said Letters Patent is hereby corrected as shown below:

Figure 2 of the drawings should appear as per attached sheet.

Signed and Sealed this

Sixteenth Day of November 1982

[SEAL]

*Attest:*

GERALD J. MOSSINGHOFF

*Attesting Officer*    *Commissioner of Patents and Trademarks*